United States Patent
De Haan et al.

(10) Patent No.: US 12,102,089 B2
(45) Date of Patent: Oct. 1, 2024

(54) METHOD FOR INACTIVATING MOLD SPORES

(71) Applicant: DSM IP ASSETS B.V., Heerlen (NL)

(72) Inventors: Ben Rudolf De Haan, Echt (NL); Angelina Dekker, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 55 days.

(21) Appl. No.: 18/048,579

(22) Filed: Oct. 21, 2022

(65) Prior Publication Data

US 2023/0111025 A1  Apr. 13, 2023

Related U.S. Application Data

(63) Continuation of application No. 16/761,174, filed as application No. PCT/EP2018/079928 on Nov. 1, 2018, now Pat. No. 11,503,832.

(30) Foreign Application Priority Data

Nov. 3, 2017  (EP) ..................... 17199803

(51) Int. Cl.
*A01N 43/90*  (2006.01)

(52) U.S. Cl.
CPC .................... *A01N 43/90* (2013.01)

(58) Field of Classification Search
CPC .................................... A01N 43/90
USPC .......................................... 514/33
See application file for complete search history.

(56) References Cited

U.S. PATENT DOCUMENTS

| | | | |
|---|---|---|---|
| 5,738,888 A | 4/1998 | Cirigliano et al. | |
| 5,773,662 A | 6/1998 | Imai et al. | |
| 5,895,681 A | 4/1999 | Cirigliano et al. | |
| 11,503,832 B2 * | 11/2022 | De Haan | A01N 43/90 |
| 2005/0042341 A1 | 2/2005 | Thomas et al. | |
| 2005/0112251 A1 | 5/2005 | Stark et al. | |
| 2010/0310722 A1 | 12/2010 | Smith | |
| 2010/0323065 A1 | 12/2010 | Smith | |
| 2014/0141137 A1 | 5/2014 | Coyne et al. | |

FOREIGN PATENT DOCUMENTS

| | | |
|---|---|---|
| EP | 0977499 A1 | 2/2000 |
| WO | 9848649 A1 | 11/1998 |

OTHER PUBLICATIONS

International Search Report for Application No. PCT/EP2018/079928 mailed Dec. 5, 2018.
Brik, "New High-Molecular Decomposition Products of Natamycin*(Pimaricin) With Intact Lactone-Ring," The Journal of antibiotics, (1976), vol. 29, No. 6:632-637.

* cited by examiner

*Primary Examiner* — Yih-Horng Shiao
(74) *Attorney, Agent, or Firm* — McBee Moore & Vanik, IP, LLC

(57) ABSTRACT

The invention relates to inactivating mold spores in a beverage using pasteurization in the presence of natamycin and to a beverage comprising natamycin and mycosamine.

19 Claims, No Drawings

METHOD FOR INACTIVATING MOLD SPORES

CROSS-REFERENCE TO RELATED APPLICATIONS

This application is a continuation of U.S. application Ser. No. 16/761,174 filed 1 May 2020, which is a National Stage entry of International Application No. PCT/EP2018/079928, filed 1 Nov. 2018, which claims priority to European Patent Application No. 17199803.2, filed 3 Nov. 2017. Each of these applications is incorporated by reference in its entirety

BACKGROUND

Field

This invention relates to inactivating mold spores in a beverage using pasteurization in the presence of natamycin.

Description of Related Art

Food spoilage can be caused by fungi, yeast, and bacteria. Because of the large scale at which food products are made, the consequence of spoilage is a severe economic loss for the food industry. Microorganisms are the main agents responsible for food spoilage and therefore food preservation procedures are targeted towards them. Food preservation methods currently used by the industry rely either on the inhibition of microbial growth or on microbial inactivation. Examples of procedures for preservation of foods are drying, salting, thermal treatment, and fermentation.

Thermal treatment is the most widely used procedure. However, heat can trigger unwanted reactions, leading to undesirable organoleptic and nutritional effects. The magnitude of this problem rapidly increases with increasing temperature and residence times. Also, another drawback of thermal treatment such as pasteurization is that a fraction of the spore population usually survives, leading to spoilage of the product after prolonged periods of time. Usually a balance is sought between as low as possible temperature and/or residence times on the one hand and acceptable amounts of surviving spores on the other hand. These limitations together with increasing consumer demand for fresh-like foods has promoted the development of alternative methods for food preservation.

For many decades, the polyene macrolide antimycotic natamycin has been used to prevent fungal growth on food products such as cheeses and sausages. This natural preservative, which is produced by fermentation using *Streptomyces natalensis*, is widely used throughout the world as a food preservative and has a long history of safe use in the food industry. It is very effective against all known food spoilage fungi. Use of natamycin in beverages, notably iced tea drinks, has been described in U.S. Pat. Nos. 5,738,888 and 5,773,062, alone or combined with other preservatives such as benzoic acid, sorbic acid and dialkyl dicarbonates as in EP 977499 and U.S. Pat. No. 5,895,681.

Unfortunately, a problem associated with the use of natamycin in low pH beverages is that natamycin is not stable in acidic environment (H. Brik, J. Antibiot. 29 (1976), 632-637) and consequently loses efficacy over time, more or less rapidly, depending on the pH value in question. Loss of natamycin stability was addressed in US 2005/042341 by encapsulating natamycin, a concept also described in US 2010/310722 (natamycin with povidone) and US 2010/323065 (natamycin with cyclodextrin). Combined with the fact that natamycin is known to only prevent germination of fungal spores, not destroy spores, results in a situation wherein spores in acidic beverages may still germinate over time when all natamycin has degraded. See for example, US 2005/112251 disclosing the prevention of germination of *Taleromyces macrosporus* using 2.5 ppm of natamycin and heat treatment in apple juice, however only for a few days, assumingly the time it takes for natamycin to degrade under acidic conditions. Thus, there remains a need for improved methods for preventing germination of mold spores in acidic beverages, preferably by inactivation, i.e. killing of the spores.

SUMMARY

Throughout the present specification and the accompanying claims, the words "comprise", "include" and "having" and variations such as "comprises", "comprising", "includes" and "including" are to be interpreted inclusively. That is, these words are intended to convey the possible inclusion of other elements or integers not specifically recited, where the context allows.

The articles "a" and "an" are used herein to refer to one or to more than one (i.e. to one or at least one) of the grammatical object of the article.

In the context of the invention the term "beverage" refers to a liquid intended for human consumption. Common types of beverages include water, milk, juices, coffee, tea and soft drinks. In addition, alcoholic drinks such as wine, beer, malt and liquor are referred to as beverages. Similarly, non-alcoholic drinks signifying drinks that would normally contain alcohol, such as beer, malt and wine, but are made with less than 0.5 percent alcohol by volume are also referred to as beverages. The category includes drinks that have undergone an alcohol removal process such as non-alcoholic beers and de-alcoholized wines. A beverage is not only understood to include ready-to-drink compositions but also concentrates comprising water and at least one other ingredient. Moreover, a beverage may comprise one or more additional additives selected from anti-foaming agents, flavors, clouding agents, coloring agents, thickening agents, vitamins, amino acids, minerals, foaming agents, hydrocolloids, herbs, nutraceutical compounds, acidity regulators, preservatives, polysaccharides, sweetening agents, emulsifiers, antioxidants, dietary fibers, mono- and polynucleotides, polypeptides, enzymes, and mixtures thereof. Each of these materials may be a single component or a mixture of two or more components.

The term "pasteurization" refers to the process of heating a liquid for a period of time at a specified temperature, then immediately followed by cooling. The process reduces the growth of micro-organisms within the liquid, thereby increasing the time before spoilage. It is primarily used on milk, which prior to pasteurization is commonly infected with pathogenic bacteria and therefore the more likely than any other part of the common diet in the developed world to cause illness. But pasteurization is not limited to milk as pasteurization can also be carried out on beverages of the instant invention.

The term "inactivating mold spores" refers to the absence of germination after a certain period of time wherein spores not treated with natamycin can still germinate, in other words "inactivating mold spores" is irreversible and refers to killing of spores.

The term "stable" refers to "microbially stable". The microbial stability of a food product can be expressed by the number of CFU in said food product, e.g. the number of CFU per gram of food product (when solid or liquid), or, if the food product is a liquid food product, as the number of CFU/ml. A stable food product produced by the method of the invention may have a number of CFU per g or ml, after a certain storage time, which is equal or less as compared to the number of CFU per g or ml at t=0. The storage time may be up to 6 weeks, preferably up to 12 weeks, more preferably up to 6 months, preferably at ambient temperature, for example at 20° C. or 25° C. Preferably up to such storage time there is no increase in CFU per g or ml, or preferably even a decrease in CFU per g or ml, for example a 50% reduction, or even a 75% reduction, or a 90% reduction. Even more preferably there are no CFU in said stable or stabilized food product up to this storage time. The stable beverage produced by the method of the invention may also be stable in that there is no smell after the specified time and temperature or in that there is no color change after the specified time and temperature.

In a first aspect, the invention provides a method for inactivating mold spores comprising subjecting a beverage having a pH of from 2.0 to 4.0 (measured at 20±2° C.) to a temperature of from 50° C. to 90° C. in the presence of natamycin.

DETAILED DESCRIPTION OF A PREFERRED EMBODIMENT

Advantageously, natamycin is used together with pasteurization as a backup means to combat spores that survived pasteurization. Under present day pasteurization practices, the germination of residual spores after pasteurization is a common and often unwanted phenomenon. Remarkably, the presence of natamycin improves the effect of pasteurization such that, under comparable conditions, pasteurization alone does not completely prevent germination, i.e. kill all spores present, whereas in the presence of natamycin no germination occurs. This is unexpected because natamycin is not stable under acidic conditions and therefore expected not to be present in sufficient amounts after prolonged incubation to be effective as preservative against fungal growth.

In an embodiment, the temperature of the method of the invention is from 60° C. to 90° C., or from 65° C. to 90° C., or from 70° C. to 90° C., or from 80° C. to 90° C. Within this range, for example at temperatures of 65±2° C., 70±2° C., 80±2° C., and 85±2° C., the added effect of natamycin on top of that of pasteurizing is well noted. The duration of the heat treatment is comparable to times normally applied for pasteurization as known to the skilled person. Pasteurization may be carried out batch-wise or in continuous mode with contact times at the elevated temperature in question of from 5 seconds to 30 minutes, or from 10 seconds to 10 minutes, or from 20 seconds to 5 minutes, or from 30 seconds to 2 minutes. Heating or pasteurization times may be like 20±5 seconds, 30±5 seconds or 40±5 seconds.

In another embodiment, the pH during the method of the invention is from 2.0 to 4.0, or from 2.5 to 3.8 or from 2.8 to 3.5, measured at 20±2° C.

The amount of natamycin used in the method of the invention is similar to amounts applied in natamycin-regulated food protection, for example from 1 to 200 ppm or from 2 to 100 ppm, or from 3 to 50 ppm, or from 5 to 25 ppm or from 10 to 20 ppm based on the total weight of said beverage.

According to the method of the invention inhibition of pathogens was observed for prolonged periods of time, i.e. several weeks or even 50 days. This is a surprising result as there are no indications in the art that the combination of natamycin and relatively short heat treatment results in irreversible inactivation of spores. US 2005/112251 describes the prevention of germination of *Taleromyces macrosporus* CBS 130.89 using 2.5 ppm of natamycin, but here the heat treatment step is not to achieve prevention of germination but rather the opposite, to stimulate germination, as *Taleromyces macrosporus* is a heat resistant organism. Moreover, the effect seems to be limited to only 4 days which is inferior to the results obtained in the instant invention.

In an embodiment, the method of the invention is suitable against a range of mold spores. Examples are those from *Aspergillus, Paecilomyces* and *Talaromyces*. Specific species are *Aspergillus niger, Paecilomyces variotti* and *Talaromyces (Rasamsonia) emersonii*.

Further, the invention provides a beverage having a pH of from 2.0 to 4.0 (measured at 20±2° C.) comprising natamycin and mycosamine (CAS 527-38-8). Mycosamine is formed under the conditions of the method of the first aspect of the invention after prolonged incubation periods. The compound is not known for any antifungal effect, nor is it toxic. The amounts wherein any of natamycin and mycosamine are present are from 0.1 to 100 ppm each, or from 0.2 to 50 ppm each, or from 0.3 to 25 ppm each, based on the total weight of said beverage.

In an embodiment, the beverage is iced tea, flavored water, fruit drinks, fruit juice, a carbonated drink, or lemonade.

The pH of the beverage is from 2.0 to 4.0, or from 2.5 to 3.8 or from 2.8 to 3.5, measured at 20±2° C.

In one embodiment, the beverage comprises at least one additional compound, preferably a compound selected from the list consisting of an acidity regulator (such as citric acid), an anticaking agent (such as isomalt), an antifoaming agent (such as methylethylcellulose, or mono- or di-glycerides of fatty acids), an antioxidant (such as vitamin C or sulphite), a color, a surfactant, a color retention agent, an emulsifier (such as polyethylene glycol, triacetin, triethyl citrate, castor oil, choline salts such as choline tartrate or -lactate, xylitol, lactitol, matlitol, polydimethylsiloxane, sodium lauryl sulfate, and lecithin), a further preservative or a dispersant (such as polyoxyethylene compounds such as polyoxyethylene sorbitan monolaurate/-monooleate/-monopalmitate/-monostearate/-tristearate, cellulose, polyvinylpyrrolidone, or propylene glycol).

The invention has many advantages. One advantage is that it allows for inactivation of molds that have survived pasteurization. Another is that shorter and/or less hot pasteurization protocols may be used.

EXAMPLES

General pH measurements were carried out at 20±2° C., unless otherwise mentioned, using a Radiometer model PHM210 pH meter equipped with a PHC4000-8 Calomel Combined pH electrode (D=5 MM).

For the analysis of mycosamine at low concentrations (ppb level) a sample preparation is used with a cation exchange SPE material to isolate mycosamine from the sample matrix and/or remove possible interfering impurities therefrom. The analysis was performed on LC-MS/MS on a ZIC-HILIC column. For the identification and (semi) quantification a reference of mycosamine was prepared. The concentration of mycosamine in this reference was determined with $^1$H-NMR. To confirm the result one sample was spiked with a small amount of the mycosamine reference before analysis and the chromatogram was compared with that of the sample without added mycosamine.

Example 1

Heath Treatment of *Aspergillus niger* Spores in the Absence and Presence of Natamycin Commercially available ice tea (Lipton, peach flavor, non-carbonated, 1.5 L) was adjusted to high water hardness by adding 1 ml of a solution of 39 g $CaCl_2$ and 27 g $MgCl_2$ added to 934 g water. ⅓ of this ice tea preparation (the pH of which was 3.15) was left as-such, ⅓ of the preparation was enriched with 5 ppm natamycin and ⅓ of the preparation was enriched with 10 ppm natamycin. Samples of 5 ml were made from each preparation in 15 ml sterile plastic tubes. Of each preparation 8 samples were pre-heated to the desired pasteurization temperature using a water bath. Temperatures used were RT, 60, 65, 70, 75, 80, 85 and 90° C. When the desired temperature was reached, 100 µl of a 2500 spores/ml spore suspension of *Aspergillus niger* ATCC 9029AA was added to each tube. Subsequently, the samples were kept for 30 seconds at the temperature in question in the water bath. Next, the samples were cooled on ice to a temperature of 25° C. Samples were incubated at 25° C. and visually examined for growth (formation of mold flakes or turbidity) for two months. Additionally, samples were enumerated according to ISO protocol 21527-1.2008 on day 0 (before heat treatment) and day 1 (after heat treatment) to count immediate loss of viability. Enumeration was repeated after 1 month when samples remained free from visual mold growth; most counts were reduced to <10 after heat treatment, but were still able to grow. For the results, see Table 1. At RT and 60° C. the normal effect of natamycin was observed: delayed germination in the presence of 5 ppm natamycin and longer delay in the presence of 10 ppm natamycin. At 70° C. it was observed that germination without natamycin took place (apparently the heat step alone was not enough to kill the spores) whereas in the presence of natamycin no germination occurred.

The sample that contained, at t=0, 10 ppm of natamycin (approximately 10 mg/L) and which was heated at 70° C. was analyzed by LC-MS/MS and found to contain <0.04 mg/L of natamycin and 2 mg/L mycosamine.

Example 2

Heath Treatment of *Aspergillus niger* Spores in the Absence and Presence of Natamycin For comparative reasons, Example 1 was repeated with an in-house strain of *Aspergillus niger*. Enumeration results were the same as in Example 1. For the results, see Table 2. At RT and 60° C. the normal effect of natamycin was observed: delayed germination in the presence of 5 ppm natamycin and longer delay in the presence of 10 ppm natamycin. At 65° C., 70° C. and 80° C. it was observed that germination without natamycin took place (apparently the heat step alone was not enough to kill the spores) whereas in the presence of natamycin no germination occurred.

The sample that contained, at t=0, 10 ppm of natamycin (approximately 10 mg/L) and which was heated at 70° C. was analyzed by LC-MS/MS and found to contain <0.04 mg/L of natamycin and 2 mg/L mycosamine.

Example 3

Heath Treatment of *Talaromyces emersonii* Spores in the Absence and Presence of Natamycin Example 1 was repeated however with *Talaromyces emersonii* (CBS 236.58, 1000 spores/ml) instead of *Aspergillus niger*. Enumeration results were the same as in Example 1. For the results, see Table 3. At RT the normal effect of natamycin was observed: delayed germination in the presence of 5 or 10 ppm natamycin. At 75° C. and 85° C. it was observed that germination without natamycin took place (apparently the heat step alone was not enough to kill the spores) whereas in the presence of natamycin (10 ppm at 75° C. and for both concentrations at 85° C.) no germination occurred.

The sample that contained, at t=0, 10 ppm of natamycin (approximately 10 mg/L) and which was heated at 70° C. was analyzed by LC-MS/MS and found to contain <0.04 mg/L of natamycin and 2 mg/L mycosamine.

Example 4

Heath Treatment of *Paecilomyces variotti* Spores in the Absence and Presence of Natamycin Example 1 was repeated however with *Paecilomyces variotti* (ATCC 22319, 1000 spores/ml) instead of *Aspergillus niger*. Enumeration results were the same as in Example 1. For the results, see Table 4. At RT and 60° C. the normal effect of natamycin was observed: delayed germination in the presence of 5 or 10 ppm natamycin. At 90° C. it was observed that germination without natamycin took place (apparently the heat step alone was not enough to kill the spores) whereas in the presence of natamycin no germination occurred.

TABLE 1

*Aspergillus niger* ATCC 9029AA in ice tea with 0 ppm, 5 ppm or 10 ppm natamycin in combination with heat treatment showing growth (+) or no growth (−) after x days

| T | Natamycin (ppm) | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| RT | 0 | − | + | + | + | + | + | + | + | + | + | + | + | + | + | + | + | + |
| RT | 5 | − | − | − | − | − | − | − | − | − | + | + | + | + | + | + | + | + |
| RT | 10 | − | − | − | − | − | − | − | − | − | − | + | + | + | + | + | + | + |
| 60 | 0 | − | − | + | + | + | + | + | + | + | + | + | + | + | + | + | + | + |
| 60 | 5 | − | − | − | − | − | − | + | + | + | + | + | + | + | + | + | + | + |
| 60 | 10 | − | − | − | − | − | − | − | − | − | + | + | + | + | + | + | + | + |
| 65 | 0 | − | − | − | − | − | − | − | − | − | − | − | − | − | − | − | − | − |
| 65 | 5 | − | − | − | − | − | − | − | − | − | − | − | − | − | − | − | − | − |

TABLE 1-continued

*Aspergillus niger* ATCC 9029AA in ice tea with 0 ppm, 5 ppm or 10 ppm natamycin in combination with heat treatment showing growth (+) or no growth (−) after x days

| T | Natamycin (ppm) | 1 | 2 | 3 | 4 | 5 | 6 | 7 | 8 | 9 | 10 | 11 | 12 | 13 | 14 | 15 | 16 | 17 | 50 |
|---|---|---|---|---|---|---|---|---|---|---|---|---|---|---|---|---|---|---|---|
| 65 | 10 | − | − | − | − | − | − | − | − | − | − | − | − | − | − | − | − | − | − |
| 70 | 0  | − | − | − | − | − | − | − | − | − | − | − | − | − | − | − | − | + | + |
| 70 | 5  | − | − | − | − | − | − | − | − | − | − | − | − | − | − | − | − | − | − |
| 70 | 10 | − | − | − | − | − | − | − | − | − | − | − | − | − | − | − | − | − | − |
| 75 | 0  | − | − | − | − | − | − | − | − | − | − | − | − | − | − | − | − | − | − |
| 75 | 5  | − | − | − | − | − | − | − | − | − | − | − | − | − | − | − | − | − | − |
| 75 | 10 | − | − | − | − | − | − | − | − | − | − | − | − | − | − | − | − | − | − |
| 80 | 0  | − | − | − | − | − | − | − | − | − | − | − | − | − | − | − | − | − | − |
| 80 | 5  | − | − | − | − | − | − | − | − | − | − | − | − | − | − | − | − | − | − |
| 80 | 10 | − | − | − | − | − | − | − | − | − | − | − | − | − | − | − | − | − | − |
| 85 | 0  | − | − | − | − | − | − | − | − | − | − | − | − | − | − | − | − | − | − |
| 85 | 5  | − | − | − | − | − | − | − | − | − | − | − | − | − | − | − | − | − | − |
| 85 | 10 | − | − | − | − | − | − | − | − | − | − | − | − | − | − | − | − | − | − |
| 90 | 0  | − | − | − | − | − | − | − | − | − | − | − | − | − | − | − | − | − | − |
| 90 | 5  | − | − | − | − | − | − | + | + | + | + | + | + | + | + | + | + | + | + |
| 90 | 10 | − | − | − | − | − | − | − | − | − | − | − | − | − | − | − | − | − | − |

TABLE 2

*Aspergillus niger* in ice tea with 0 ppm, 5 ppm or 10 ppm natamycin in combination with heat treatment showing growth (+) or no growth (−) after x days

| T | Natamycin (ppm) | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| RT | 0  | − | − | + | + | + | + | + | + | + | + | + | + | + | + |
| RT | 5  | − | − | − | − | − | − | + | + | + | + | + | + | + | + |
| RT | 10 | − | − | − | − | − | − | − | − | − | − | + | + | + | + |
| 60 | 0  | − | − | − | + | + | + | + | + | + | + | + | + | + | + |
| 60 | 5  | − | − | − | − | − | − | + | + | + | + | + | + | + | + |
| 60 | 10 | − | − | − | − | − | − | − | − | − | − | + | + | + | + |
| 65 | 0  | − | − | + | + | + | + | + | + | + | + | + | + | + | + |
| 65 | 5  | − | − | − | − | − | − | − | − | − | − | − | − | − | − |
| 65 | 10 | − | − | − | − | − | − | − | − | − | − | − | − | − | − |
| 70 | 0  | − | + | + | + | + | + | + | + | + | + | + | + | + | + |
| 70 | 5  | − | − | − | − | − | − | − | − | − | − | − | − | − | − |
| 70 | 10 | − | − | − | − | − | − | − | − | − | − | − | − | − | − |
| 75 | 0  | − | − | − | − | − | − | − | − | − | − | − | − | − | − |
| 75 | 5  | − | − | − | − | − | − | − | − | − | − | − | − | − | − |
| 75 | 10 | − | − | − | − | − | − | − | − | − | − | − | − | − | − |
| 80 | 0  | − | − | − | − | − | − | − | − | − | − | − | − | − | + |
| 80 | 5  | − | − | − | − | − | − | − | − | − | − | − | − | − | − |
| 80 | 10 | − | − | − | − | − | − | − | − | − | − | − | − | − | − |
| 85 | 0  | − | − | − | − | − | − | − | − | − | − | − | − | − | − |
| 85 | 5  | − | − | − | − | − | − | − | − | − | − | − | − | − | − |
| 85 | 10 | − | − | − | − | − | − | − | − | − | − | − | − | − | − |
| 90 | 0  | − | − | − | − | − | − | − | − | − | − | − | − | − | − |
| 90 | 5  | − | − | − | − | − | − | − | − | − | − | − | − | − | − |
| 90 | 10 | − | − | − | − | − | − | − | − | − | − | − | − | − | − |

TABLE 3

*Talaromyces emersonii* in ice tea with 0 ppm, 5 ppm or 10 ppm natamycin in combination with heat treatment showing growth (+) or no growth (−) after x days

| T | Natamycin (ppm) | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| RT | 0  | − | − | + | + | + | + | + | + | + | + | + | + | + | + |
| RT | 5  | − | − | − | − | − | − | + | + | + | + | + | + | + | + |
| RT | 10 | − | − | − | − | − | − | + | + | + | + | + | + | + | + |

TABLE 3-continued

*Talaromyces emersonii* in ice tea with 0 ppm, 5 ppm or 10 ppm natamycin in combination with heat treatment showing growth (+) or no growth (−) after x days

| T | Natamycin (ppm) | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 60 | 0 | − | − | − | + | + | + | + | + | + | + | + | + | + | + |
| 60 | 5 | − | − | − | − | − | − | − | − | − | − | − | − | − | − |
| 60 | 10 | − | − | − | − | − | − | − | − | − | − | − | − | − | − |
| 65 | 0 | − | − | − | − | − | − | − | − | − | − | − | − | − | − |
| 65 | 5 | − | − | − | + | + | + | + | + | + | + | + | + | + | + |
| 65 | 10 | − | − | − | − | − | − | − | − | − | − | − | − | − | − |
| 70 | 0 | − | − | − | − | − | − | − | − | − | − | − | − | − | − |
| 70 | 5 | − | − | − | − | − | − | − | − | − | − | − | − | − | − |
| 70 | 10 | − | − | − | − | − | − | − | − | − | − | − | − | − | − |
| 75 | 0 | − | − | + | + | + | + | + | + | + | + | + | + | + | + |
| 75 | 5 | − | − | − | + | + | + | + | + | + | + | + | + | + | + |
| 75 | 10 | − | − | − | − | − | − | − | − | − | − | − | − | − | − |
| 80 | 0 | − | − | − | − | − | − | − | − | − | − | − | − | − | − |
| 80 | 5 | − | − | − | − | − | − | − | − | − | − | − | − | − | − |
| 80 | 10 | − | − | − | − | − | − | − | − | − | − | − | − | − | − |
| 85 | 0 | − | − | + | + | + | + | + | + | + | + | + | + | + | + |
| 85 | 5 | − | − | − | − | − | − | − | − | − | − | − | − | − | − |
| 85 | 10 | − | − | − | − | − | − | − | − | − | − | − | − | − | − |
| 90 | 0 | − | − | − | − | − | − | − | − | − | − | − | − | − | − |
| 90 | 5 | − | − | − | − | − | − | − | − | − | − | − | − | − | − |
| 90 | 10 | − | − | − | − | − | − | − | − | − | − | − | − | − | − |

TABLE 4

*Paecilomyces variotti* ATCC 22319 in ice tea with 0 ppm, 5 ppm or 10 ppm natamycin in combination with heat treatment showing growth (+) or no growth (−) after x days

| T | Natamycin (ppm) | 1 | 2 | 3 | 4 | 5 | 6 | 7 | 8 | 9 | 10 | 11 | 12 | 13 | 14 | 15 | 16 | 17 | 50 |
|---|---|---|---|---|---|---|---|---|---|---|---|---|---|---|---|---|---|---|---|
| RT | 0 | − | + | + | + | + | + | + | + | + | + | + | + | + | + | + | + | + | + |
| RT | 5 | − | − | − | − | − | − | − | − | − | + | + | + | + | + | + | + | + | + |
| RT | 10 | − | − | − | − | − | − | − | − | − | − | + | + | + | + | + | + | + | + |
| 60 | 0 | − | − | + | + | + | + | + | + | + | + | + | + | + | + | + | + | + | + |
| 60 | 5 | − | − | − | − | − | − | − | − | − | + | + | + | + | + | + | + | + | + |
| 60 | 10 | − | − | − | − | − | − | − | − | − | − | − | − | − | + | + | + | + | + |
| 65 | 0 | − | − | − | − | − | − | − | − | − | − | − | − | − | − | − | − | − | − |
| 65 | 5 | − | − | − | − | − | − | − | − | − | − | − | − | − | − | − | − | − | − |
| 65 | 10 | − | − | − | − | − | − | − | − | − | − | − | − | − | − | − | − | − | − |
| 70 | 0 | − | − | − | − | − | − | − | − | − | − | − | − | − | − | − | − | − | − |
| 70 | 5 | − | − | − | − | − | − | − | − | − | − | − | − | − | − | − | − | − | − |
| 70 | 10 | − | − | − | − | − | − | − | − | − | − | − | − | − | − | − | − | − | − |
| 75 | 0 | − | − | − | − | − | − | − | − | − | − | − | − | − | − | − | − | − | − |
| 75 | 5 | − | − | − | − | − | − | − | − | − | − | − | − | − | − | − | − | − | − |
| 75 | 10 | − | − | − | − | − | − | − | − | − | − | − | − | − | − | − | − | − | − |
| 80 | 0 | − | − | − | − | − | − | − | − | − | − | − | − | − | − | − | − | − | − |
| 80 | 5 | − | − | − | − | − | − | − | − | − | − | − | − | − | − | − | − | − | − |
| 80 | 10 | − | − | − | − | − | − | − | − | − | − | − | − | − | − | − | − | − | − |
| 85 | 0 | − | − | − | − | − | − | − | − | − | − | − | − | − | − | − | − | − | − |
| 85 | 5 | − | − | − | − | − | − | − | − | − | − | − | − | − | − | − | − | − | − |
| 85 | 10 | − | − | − | − | − | − | − | − | − | − | − | − | − | − | − | − | − | − |
| 90 | 0 | − | − | − | − | + | + | + | + | + | + | + | + | + | + | + | + | + | + |
| 90 | 5 | − | − | − | − | − | − | − | − | − | − | − | − | − | − | − | − | − | − |
| 90 | 10 | − | − | − | − | − | − | − | − | − | − | − | − | − | − | − | − | − | − |

The invention claimed is:

1. A beverage having a pH of from 2.0 to 4.0 when measured at 20±2° C., wherein the beverage comprises an antifungal agent consisting of an effective amount of natamycin and mycosamine; and wherein mold spores of *Aspergillus* in the beverage are inactivated.

2. The beverage according to claim 1, wherein the amount of each of natamycin and mycosamine in the beverage is from 0.1 to 100 ppm based on the total weight of said beverage.

3. The beverage according to claim 2, wherein the amount of each of natamycin and mycosamine in the beverage is from 0.2 to 50 ppm based on the total weight of the beverage.

4. The beverage according to claim 3, wherein the amount of each of natamycin and mycosamine in the beverage is from 0.3 to 25 ppm based on the total weight of the beverage.

5. The beverage according to claim 4, wherein the amount of natamycin in the beverage is from 10 to 20 ppm based on the total weight of the beverage.

6. The beverage according to claim 5, wherein the amount of natamycin in the beverage is about 10 ppm based on the total weight of the beverage.

7. The beverage according to claim 1, wherein the beverage is selected from the group consisting of iced tea, flavored water, fruit juice, a carbonated beverage, and lemonade.

8. The beverage according to claim 1, wherein the beverage is pasteurized.

9. The beverage according to claim 1, wherein the beverage comprises at least one additional compound selected from the group consisting of an acidity regulator, an anticaking agent, an antifoaming agent, an antioxidant, a color, a color retention agent, a surfactant, an emulsifier, an additional preservative, and a dispersant.

10. The beverage according to claim 1, wherein the beverage is microbially stable.

11. The beverage according to claim 1, wherein the natamycin is present in an amount of less than 0.04 mg/L and the mycosamine is present in an amount of 2 mg/L.

12. A beverage comprising an antifungal agent consisting of an effective amount of natamycin and mycosamine, wherein the beverage is produced by subjecting the beverage having a pH of from 2.0 to 4.0, measured at 20±2° C. to a temperature of from 50° C. to 90° C. in the presence of natamycin and mycosamine; and
  wherein mold spores of *Aspergillus* in the beverage are inactivated.

13. The beverage according to claim 12, wherein the temperature is from 65° C. to 85° C.

14. The beverage according to claim 12, wherein the temperature is from 80° C. to 90° C.

15. The beverage according to claim 12, wherein the amount of each of natamycin and mycosamine in the beverage is from 0.1 to 100 ppm based on the total weight of said beverage.

16. The beverage according to claim 12, wherein the natamycin is present in an amount of less than 0.04 mg/L and the mycosamine is present in an amount of 2 mg/L.

17. The beverage according to claim 12, wherein the beverage is selected from the group consisting of iced tea, flavored water, fruit juice, a carbonated beverage, and lemonade.

18. The beverage according to claim 12, wherein the beverage comprises at least one additional compound selected from the group consisting of an acidity regulator, an anticaking agent, an antifoaming agent, an antioxidant, a color, a color retention agent, a surfactant, an emulsifier, an additional preservative, and a dispersant.

19. The beverage according to claim 12, wherein the beverage is microbially stable.

* * * * *